/

US007818780B1

(12) United States Patent
Salmi et al.

(10) Patent No.: US 7,818,780 B1
(45) Date of Patent: Oct. 19, 2010

(54) METHOD AND COMPILER FOR ROUTING POLICY (75) Inventors: Robert James Salmi, Minnetonka, MN (US); Michael Robert Rowlee, St. Paul, MN (US); Thomas P. Barron, Minneapolis, MN (US); Stuart Charles Stanley, Eden Prairie, MN (US); Haldane Roy Peterson, Bloomington, MN (US); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 1132 days.

(21) Appl. No.: 10/816,138

(22) Filed: Apr. 1, 2004

(51) Int. Cl.
*H04L 9/34* (2006.01)
*H04L 9/32* (2006.01)
(52) U.S. Cl. .......................... 726/1; 717/163; 717/137; 709/242
(58) Field of Classification Search ................ 726/1; 717/137, 140–142, 146–147, 151–153, 163; 709/242
See application file for complete search history.

(56) References Cited

U.S. PATENT DOCUMENTS

| 6,829,347 | B1 | 12/2004 | Odiaka |
| 6,839,350 | B1 | 1/2005 | Inouchi et al. |
| 7,020,718 | B2 | 3/2006 | Brawn et al. |
| 2002/0141343 | A1 | 10/2002 | Bays |
| 2002/0141378 | A1 | 10/2002 | Bays et al. |
| 2002/0199016 | A1 | 12/2002 | Freedman |
| 2003/0204619 | A1 | 10/2003 | Bays |
| 2004/0039942 | A1* | 2/2004 | Cooper et al. ............... 713/201 |
| 2004/0088431 | A1 | 5/2004 | Carter |
| 2004/0199664 | A1 | 10/2004 | Feldman |
| 2004/0230681 | A1* | 11/2004 | Strassner et al. ............ 709/226 |
| 2005/0198382 | A1 | 9/2005 | Salmi et al. |

FOREIGN PATENT DOCUMENTS

| WO | WO-2005072344 A2 | 8/2005 |
| WO | WO-2005072344 A3 | 8/2005 |

OTHER PUBLICATIONS

"International Search Report for PCT Application No. PCT/US05/02369, mailed Apr. 19, 2007", 3 p.
"Written Opinion of the International Searching Authority for PCT Application No. PCT/US05/02369, mailed Apr. 19, 2007", 3 p.

* cited by examiner

*Primary Examiner*—Gilberto Barron, Jr.
*Assistant Examiner*—Venkat Perungavoor
(74) *Attorney, Agent, or Firm*—Schwegman, Lundberg & Woessner, P.A.

(57) ABSTRACT

A routing policy compiler generates a configuration data abstraction layer of a routing policy which maps configuration to an intermediate layer comprising fields, operators and arguments. A policy repository verifies the intermediate layer against a set of verification rules for one or more client protocols including versions thereof. The policy repository may generate compiled policy transmission language for use by one or more client protocols including versions thereof. The policy compiler supports multiple software versions of client protocols with differing capabilities as well as differing client protocols. In some embodiments, an optimization may be performed on a compiled policy so that route updates are processed more efficiently. The policy compiler may permit the addition of new attributes to a routing protocol without having to recompile. Policy statements may be verified for more that one client protocol including more than one version of a client protocol. Routers may be transitioned between configuration states without transitioning between intervening states.

47 Claims, 7 Drawing Sheets

METHOD AND COMPILER FOR ROUTING POLICY

TECHNICAL FIELD

Embodiments of the present invention pertain to routers and routing systems, and in particular, to routing policy and routing-policy configuration.

BACKGROUND

One problem with conventional routers is that they allow only one version of client protocol software to run on the system at a time because the different versions of client protocol software may have different capabilities.

Another problem with conventional routers is that they may support many thousands or tens of thousands of peers. Each peer may have unique input and output policies. This places a heavy burden on the routing protocols especially when processing route updates from peers.

Another problem with conventional routers is that software for manipulating route attributes has protocol specific knowledge for each routing protocol's respective route attributes supported by the software. Whenever a new attribute is added to a protocol, all the software to manipulate routes for each of the protocols may have to be re-compiled, even when the change are isolated to one protocol.

Another problem with supporting more than one client protocol including more than one version of a client protocol is that statements not supported by any one protocol or version thereof may be skipped during execution. A user or operator may not know what statements are being skipped and may be unable to predict the behavior of the system.

Another problem with conventional routers is that when a new routing policy is added when the router is implementing a prior routing policy, the router may transition among intermediate configuration states. These intermediate configuration states may provide undesirable results and may result in network instability.

Thus, there are general needs for methods and policy compilers that support multiple software versions of client protocols with differing capabilities as well as differing client protocols. Thus, there are also general needs for methods and policy compilers that process route updates more efficiently. Thus, there are also general needs for methods and routers that permit the addition of new attributes to a routing protocol without having to recompile the policy compiler itself. Thus, there are also general needs for methods and policy compilers that verify policy statements for more that one client protocol including more than one version of a client protocol. Thus, there are also general needs for methods and policy compilers that may transition between configuration states without transitioning between intervening states.

SUMMARY

A routing policy compiler generates a configuration data abstraction layer of a routing policy which maps configuration to an intermediate layer comprising fields, operators and arguments. A policy repository verifies the intermediate layer against a set of verification rules for one or more client protocols including versions thereof. The policy repository may generate compiled policy transmission language for use by the one or more client protocols including differing versions thereof. The policy compiler may support multiple software versions of the client protocols with differing capabilities as well as different client protocols. In some embodiments, an optimization may be performed on a compiled policy so that route updates are processed more efficiently. In some embodiments, the policy compiler may permit the addition of new attributes to a routing protocol without having to recompile. In some embodiments, policy statements may be verified for more that one client protocol including more than one version of a client protocol. In some embodiments, a router may be transitioned between configuration states without transitioning between intervening states thus increasing network stability.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims. Such embodiments of the invention may be referred to, individually or collectively, herein by the term "invention" merely for convenience and without intending to voluntarily limit the scope of this application to any single invention or inventive concept if more than one is in fact disclosed.

Figure 1A:
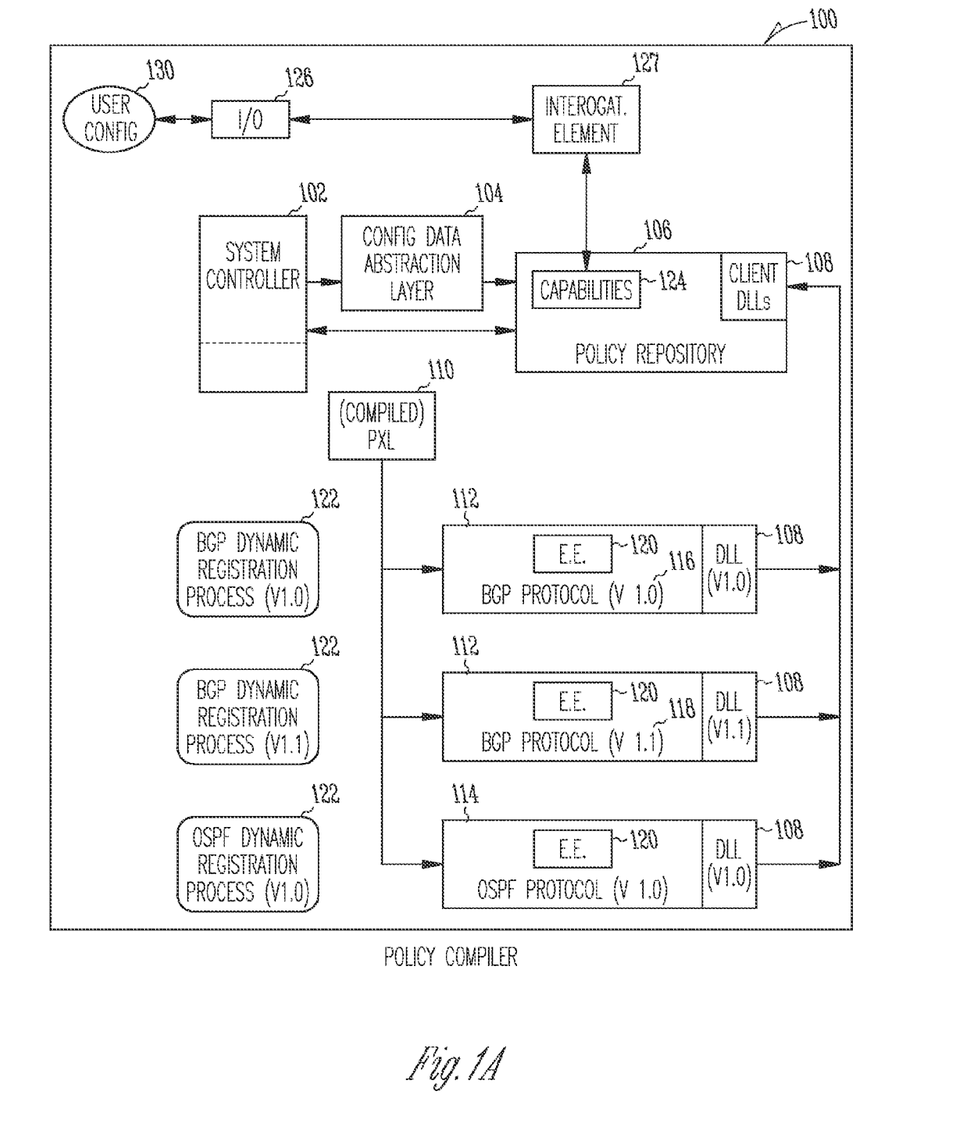
FIGS. 1A & 1B illustrate functional block diagrams of a policy compiler and a router in accordance with some embodiments of the present invention.
Figure 1B:
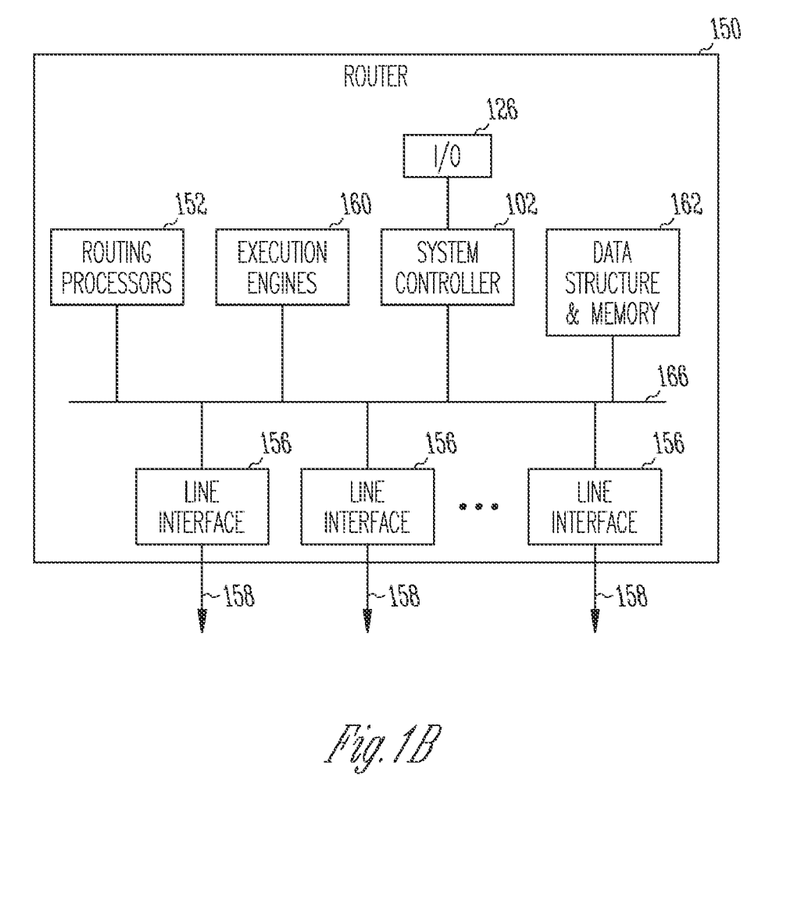

FIGS. 1A & 1B illustrate functional block diagrams of policy compiler 100 and router 150 in accordance with some embodiments of the present invention. Policy compiler 100 (FIG. 1A) comprises system controller 102 to receive route policies through I/O 126 and to perform initial operations on the received routing policies. Policy compiler 100 also comprises policy repository 106 to perform operations on routing policies and generate compiled routing polices 110. Router 150 may be suitable for use in running the processes and operations illustrated in policy compiler 100, in addition to performing functions of a router. Elements having the same reference designations in FIG. 1A and FIG. 1B correspond to the same one or more functional elements.

In some embodiments, a user may enter a routing policy configuration through I/O 126. This interaction may be constrained by the capabilities of the system. In some embodiments, interrogation element 127 may interrogate or obtain capabilities 124 of client protocols 112 from policy repository 106 so that the entered user configuration may be constrained or adhere to system capabilities. In some embodiments, interrogation element 127 may included functionality for parsing, for performing lexical analysis's, and for operating on context free (CF) grammar.

Interrogation element 127 may produce an internal representation (e.g., a data abstraction layer) of the statements from the policy configuration. Policy repository 106 may verify the policy upon receipt of the internal representation by interrogation element 127. As illustrated, policy repository 106 may be linked with client dynamic link libraries (DLLs) 108 which may enable policy repository 106 to use verification routines associated with particular client protocols. In some embodiments, the configuration that is entered may be associated with a particular client protocol 112 and version to allow policy repository 106 to query the proper one of DLLs 108.

In some embodiments, when policy repository 106 verifies a configuration, the internal representation may be written to a system database which may be used by a user for interrogating the system. Policy repository 106 may also generate compiled routing policies 110 from the policy configuration. Compiled routing policies 110 may be used by client protocols 112 for running against routes. Policy repository 106 may generate compiled routing policies 110 in policy transmission language (PXL), which may be stored in a system database. The internal representation of the policy, on the other hand, may be generated and stored in an extensible markup language (XML), although the scope of the invention is not limited in this respect. Once compiled routing policies 110 are stored in the system database, client protocols 112 may be notified to use or reuse the policy.

In some embodiments, router 150 may perform routing between peer routers as described herein. Router 150 may include routing processors 152 and a plurality of line interfaces 156 to route communications received over links 158 in accordance with a routing database managed by the routing processors. Routing processors 152 may include at least a processing element and associated memory. In some embodiments, a local routing information base (RIB) may be generated and may be used to generate a forwarding information base (FIB) in which the data may be downloaded to line cards 158. The routing databases may be stored in data structure and memory 162.

In some embodiments, routing processors 152 may receive a route update message from one of the peer routers indicating a new route handled by the peer router. Routing processors 152 may add the new route to a current routing database. In some embodiments, when routing processors 152 receive a route update message from one of the peer routers that identifies a route to withdraw, the route update message may indicate a withdrawn route no longer handled by that peer router. Routing processors 152 may remove the withdrawn route from the current routing database. Routing processors 152 may also remove a prefix of the withdrawn route from a prefix table when the current routing database includes no routes with that particular prefix.

Line interfaces 156 may route packets in accordance with a routing database, which may be provided by routing processors 152 over communication path 166. Communication path 166 may be a bus or other communication link between elements of router 150. Router 150 may include other communication paths that are not illustrated. In some embodiments, after the routing database is updated by routing processors 152, the update may be provided to line interfaces 156.

Execution engines 160 may include one or more processing elements and associated memory to execute client protocols, such as client protocols 112. In some embodiments, execution engines 160 may comprise an individual execution engine associated with each version of the client protocols that may operate on router 150, although the scope of the invention is not limited in this respect.

In some embodiments, routing processors 152 may include processing elements and associated memory to execute dynamic registration processes 122. In some embodiments, a separate one of routing processors 152 may be associated with each version of the client protocols that may operate on router 150, although the scope of the invention is not limited in this respect. In other embodiments, routing processors 152 may comprise one processing element which may concurrently run each of dynamic registration processes 122.

Data structure and memory 162 may comprise one or more data structures stored in memory. In accordance with some embodiments, data structure and memory 162 may include data such as capabilities, client DLLs 108, configuration data abstraction layer 104, and complied PXL 110 (FIG. 1A), among other things.

In some embodiments, the operations performed by policy repository 106 may be performed by one or more processing elements and associated memory (not illustrated). In these embodiments, capabilities and client DLLs 108 associated with policy repository 106 may be stored in the associated memory. In some other embodiments, the operations performed by policy repository 106 may be performed by processors and associated memory of system controller 102, although the scope of the invention is not limited in this respect.

Although router 150 is illustrated as having several separate functional elements, one or more of the functional elements may be combined and may be implemented by combinations of software configured elements, such as processors including digital signal processors (DSPs), and/or other hardware elements.

In accordance with some embodiments of the present invention, policy compiler 100 may generate a compiled internal policy representation of a routing policy which may be support multiple configuration syntaxes including multiple client protocols and multiple versions of the client protocols. In these embodiments, a centralized policy compiler and an abstraction layer allows client protocols 112 to run multiple software versions of one protocol simultaneously, even though the different versions may have differing capabilities. This is discussed in more detail below. In some embodiments, the compiler may optimize a policy configuration to improve protocol performance during execution. This is also discussed in more detail below.

In accordance with these embodiments, system controller 102 may generate configuration data abstraction layer 104 from a routing policy. The configuration data abstraction layer 104 maps configuration to an intermediate layer comprising fields, operators and arguments.

Policy repository 106 may verify the intermediate layer against a set of verification rules 108 for one or more client protocols 112, 114 including versions thereof. Policy repository 106 may generate compiled policy transmission language (PXL) 110 for use by the one or more client protocols 112 including versions thereof.

In some embodiments, policy repository 106 may verify the intermediate layer against the set of verification rules for a particular one or more of client protocols 112, 114 including versions 116, 118 of the client protocols. In these embodiments, policy repository 106 may generate compiled policy transmission language for use by the one or more client protocols 112, 114 including versions thereof.

In these embodiments, for each statement in the policy, policy repository 106 may verify fields for each of the client protocols 112 including versions thereof. Policy repository 106 may also verify field-operator parings in the policy and may also verify one or more arguments used for each field-operator pairing in the policy. The verifying may be based on verification rules associated with a client dynamic link library (DLL) 108 for each of the client protocols 112, 114 including versions thereof.

In some embodiments, policy repository 106 may validate a policy against at least two software versions of a border gateway protocol (BGP), illustrated as client protocols 116 & 118. The compiled policy transmission language may then be executed by the two versions of the border gateway protocol.

In some embodiments, policy repository 106 may further validate a policy against one or more versions of a border gateway protocol (BGP) 116, 118, one or more versions of an open-shortest-path-first (OSPF) client protocol 114 and one or more versions of an intermediate system to intermediate system (IS-IS) client protocol, although the scope of the invention is not limited in this respect. In these embodiments, policy compiler 100 may further comprise an execution engine 120 associated with each of the versions of the client protocols. Associated execution engines 120 may separately execute the compiled policy transmission language.

Accordingly, a single routing policy may be used by different client protocols as well as by more than one version of a client protocol. In some embodiments, other client protocols and versions thereof other than those illustrated may be included in policy compiler 100. For example, an intermediate system to intermediate system (IS-IS) client protocol, an open-shortest-path-first v3 (OSPF) client protocol, as well as other unicast protocols may be included in policy compiler 100 as client protocols 112. In some embodiments, multicast client protocols may also be included in policy compiler 100, although the scope of the invention is not limited in this respect.

In some embodiments, policy repository 106 may perform a verification in response to a request for use of the policy for an attach point. The attach point may refer to a set of capabilities associated with a version of one of client protocols 112. In some embodiments, attach points may refer to a set of capabilities (e.g., fields and operators) which may support a certain set of desired results. In some embodiments, client protocols 112 may include one or more attach points. The attach points within a client protocol 112 may have differing properties, and accordingly, a routing policy may be valid for some attach points of a client protocol and not valid for other attach points of the client protocol.

In some embodiments, the compiled policy transmission language of compiled route policies 110 may be viewed as a compiled abstraction layer. It may include a set of rules for each policy statement of a verified policy for execution by one of execution engines 120 when verified against one of client protocols 112 or versions thereof. Accordingly, in some embodiments, a single policy may be used by more than one client protocol and more than one version of the client protocol.

In some embodiments, one of execution engines 120 may be associated with each of a plurality of client protocols 112 and versions thereof. Execution engines 120 may execute the compiled policy transmission language based on execution rules provided by an associated one of client dynamic link libraries 108. The associated client dynamic link library may include protocol specific operators, although the scope of the invention is not limited in this respect.

Abstraction layer 104 provides an interface between user configuration 130 and the compiler which may effectively decouple a command-line interface from client protocols 112. In addition, an abstraction layer (e.g., compiled policy transmission language in compiled route policies 110) is provided between the compiler and client protocols 112 so that the router does not necessarily have to be upgraded as the capabilities of the protocols change (e.g., new versions are added). System controller 102 may be informed of the generic elements that comprise a configuration, such as fields, operations, and values, without having to know what the protocol-specific fields, operations and values may be. In this way, system controller 102 may produce internal representations of a policy without knowing specifics of what each element means within the context of a client protocol. For example, from the verification rules, system controller 102 may know that a BGP client protocol includes an "as-path" field, but is not required to have the information to interpret this field. The information for interpreting the field may remain with client protocols 112, rather than being embedded in system controller 102. As a result, a routing system may be more stable and more reliable, especially during software/protocol upgrades because one of individual client protocols 112 may only have to be upgraded.

Although these embodiments of the present invention are described as applicable to routing policies, the scope of the invention is not limited in this respect. Embodiments may also be applicable to logic flow and other control-plane elements of a router or routing system. Some embodiments may apply to control and data plane elements including quality of service and packet forwarding.

In some embodiments, policy compiler 100 may perform an optimization on a compiled route policy of compiled route policies 110 to help reduce processing operations when the compiled policy is executed on of the client protocols 112. The optimization may be performed either before or after policy compiler 100 receives a route update message from a peer router. The route update message may associated one of the plurality of client protocols 112 and may also be associated with a version of one of the client protocols. In some embodiments, the route update message may include a plurality (i.e., a batch) of updated routes. At least some of the updated routes may have differing prefixes (i.e., different routes) and may have attributes of identical values. In some embodiments, there may be many routes identified in a route update message that may share identical attributes, although the scope of the invention is not limited in this respect.

The client protocols 112, including versions thereof, may mark route attributes in a route update message as invariant for the route attributes that share values across differing route prefixes. One of execution engines 120 associated with the client protocol may cache results for statements of the compiled route policy associated with the marked attributes when executing the compiled policy. Upon continued execution of the compiled policy, the execution engine 120 may use the cached results for evaluations of subsequent statements in the policy which reference the marked attributes.

In some embodiments, the client protocols 112 including versions thereof may also mark route attributes in a route update message as invariant when one or more attributes do not change with respect to the received routes that are to be executed with respect to an associated routing policy.

In some embodiments, as part of caching, one of execution engines 120 may temporarily store execution results of the statements associated with the marked attributes when executing the compiled policy. Furthermore, the execution engine may use the cached results for the marked attributes to obtain a result for a route. The result may include a modified route, an accepted and unchanged route, or dropped route.

In some embodiments, client protocols 112 may make multiple runs or executions of a compiled policy. As each run is made for a route or a set or routes, a comparison statement may be skipped when a comparison to an invariant attribute is encountered and previously computed results may be used.

In some embodiments, client protocols 112 may characterize the operations on the various attributes with respect to an amount of processor cycles required to perform the operation. In some embodiments, the policy compiler in the policy repository 108 may use this characterization to re-order statements in a routing policy such that the effect of the re-ordered policy is equivalent to the unchanged policy, but the number of processor cycles may be reduced by performing the inexpensive operations first. In some cases, performing the inexpensive operations first allows the expensive operations to be skipped entirely.

In some embodiments, more than one version of a client protocol may operate on policy compiler 100. In these embodiments, policy compiler 100 may include dynamic registration processes 122, which may be each associated with at least first and second versions of a client protocol, such as client protocols 116 and 118. Dynamic registration processes 122 may provide policy repository 106 with a location of an associated one of dynamic link libraries 108 for an associated one of the versions of the client protocol 112. Dynamic registration processes 122 may also provide policy repository 106 with a registration location for configuration space to be used by a routing policy for use when registering with the associated version of client protocols 112. Each version of the client protocols may have configuration space and a DLL associated therewith.

In these embodiments, when a routing policy is used with a second version of a client protocol while a first version of the client protocol is also running on policy compiler 100, the second version of the client protocol may verify policy statements of the routing policy with verification rules in the DLL associated with the second version of the client protocol. The second version of the client protocol may use the configuration space associated with the second version of the client protocol for the verification.

In some embodiments, policy compiler 100 may include additional dynamic registration processes 122 for each additional client protocol. In some embodiments, the versions of the client protocols may include at least two versions of a border gateway protocol (BGP). In some embodiments, additional client protocols may include an open-shortest-path-first (OSPF) client protocol and/or an intermediate system to intermediate system (IS-IS) client protocol. Other unicast as well as multicast protocols may also be applicable to embodiments of the present invention.

In some embodiments, when the policy statements of the routing policy requesting use of a second version of the client protocol are verified, the second version of the client protocol may be requested to move at least some peer routers to the second version of the client protocol. It may also be requested to remove the at least some peer routers from the first version of the client protocol.

In some embodiments, dynamic registration processes 122 may comprise software agents operating within policy compiler 100. In some embodiments, policy compiler 100 may further comprise a parser as part of interrogation element 127 to query the policy repository 106 for capabilities 124 of the configuration associated with the second version of the client protocol when configuration associated with the second version is being added or as each token is parsed.

Because each routing protocol may support a set of fields as well as operations on those fields, which may be used in policies, the set of fields and operators may be different between the various routing protocols and versions thereof. A routing policy may be used by different protocols, even though there may be statements in the route policy that are not supported by all the protocols that may use the policy.

In accordance with some embodiments of the present invention, policy compiler 100 may perform crosschecking of a routing policy during its generation before the routing policy is used. In these embodiments, policy compiler 100 may verify statements of a new or newly added routing policy prior to compiling the routing policy and prior to executing the compiled routing policy at an attach point.

Accordingly, errors in a policy may be detected before a policy is used at an attach point. This may help reduce runtime errors that have negative effects on routing networks. In some embodiments, the verification may be supported for each software version of client protocols 112 allowing the support of multiple software versions with differing capabilities. In some embodiments, a user may control the granularity of the verification. This is discussed in more detail below.

In these embodiments, policy repository 106 may store capabilities 124 for one or more attach points. Dynamic registration processes 122 may inform policy repository 106 of the usage of a routing policy at one or more of the attach points and it may inform policy repository 106 of the client protocol and version in use at that attach point. In some embodiments, dynamic registration processes 122 may be associated with a version of a client protocol. In these embodiments, policy repository 106 may check statements of a routing policy against the capabilities of one or more attach points during generation of the policy by using the information provided in client DLLs 108 which may enumerate the capabilities at each attach point for a specific client protocol and version and the routing policy usage and version information provided by the dynamic registration process 122.

In some embodiments, DLLs 108 may describe fields supported by an associated version of client protocols 112. DLLs 108 may further describe operators supported by the fields for the associated version of client protocols 112. In some embodiments, DLLs 108 may include a verification function for field-operator combinations associated with versions of client protocols 112. The verification function may used by policy repository 106 when applying a policy at an attach point for the associated version of a client protocol. In some embodiments, policy repository 106 may check statements when the routing policy is initially being defined.

In some embodiments, one of dynamic registration processes 122 associated with version of client protocols 112 may inform policy repository 106 to load one of the libraries associated with a particular attach points associated with a versions a client protocol.

In some embodiments, each version of the client protocols may have one or more attach points. The attach points may comprise, among other things, incoming neighbor points, outgoing neighbor points, aggregation points and dampening points. In some embodiments, an indication may be provided through I/O 126 when a statement of the routing policy currently being checked is not supported by capabilities 124 of one of the attach points. In some embodiments, a selection by a user may be received through I/O 126. The selection may direct policy repository 106 to either skip the statement not supported by the attach point, or reject the policy when the statement is not supported by the attach point. The indication may be selectable by the user and may include ignoring the statement when an operation is not supported by the attach point, ignoring and warning that the operation is not supported by the attach point, or rejecting the policy when the operation is not supported by the attach point.

In some embodiments, policy repository 106 may compile the routing policy when either all statements are verified or when statements not supported by an attach point are skipped. One of execution engines 120 associated with a version of a client protocol 112 may execute the compiled routing policy and may skip statements not supported by an associated attach point.

In accordance with some embodiments of the present invention, policy compiler 100 may change its configuration state while the router is operating. In these embodiments, the router may transition from a first configuration state associated with the first route policy to a second configuration state associated with a second route policy without transitions to intermediate or intervening configuration states. The first configuration state may represent a first route policy and the second configuration state may represent the second route policy.

In these embodiments, policy repository 106 may group configuration elements of the second route policy into policy statements and sets. Policy repository 106 may also verify the grouped configuration elements against capabilities 124 with verification rules in DLLs 108 associated with one or more versions of client protocols 112. Policy repository 106 may compile statements of the second route policy when they are verified for at least one of the versions of client protocols 112. System controller 102 may notify the versions of client protocols 112 that the second route policy is to take effect.

In embodiments, the grouping of the statements may prevent the statements of the second policy from being executed one at a time as the individual statements are received which may result in an intermediate router configuration state for each statement of the second policy. These intermediate router configuration states may result in undesirable results which may cause network instability. For example, during an intermediate router configuration state, the router may advertise or accept undesired routes.

After compiling, policy compiler 106 may overwrite a compiled version of the first route policy with a compiled version of the second route policy. The second route policy may be in compiled policy transmission language, although the scope of the invention is not limited in this respect.

In some embodiments, when all statements of the second policy are verified, the policy may be accepted as a whole, and when any of the statements do not verify, the policy may be rejected as a whole. An accepted policy may be compiled and client protocols 112 may be notified that the policy is to take effect. In other embodiments, a policy having some statements that do not verify may be accepted and compiled. In these embodiments, the statements that did not verify for a particular client protocol or client protocol version may be ignored during execution. In these embodiments, a user or operator may determine whether to accept or reject the policy based on the statements that do not verify.

Although policy compiler 100 is illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein.

Figure 2:
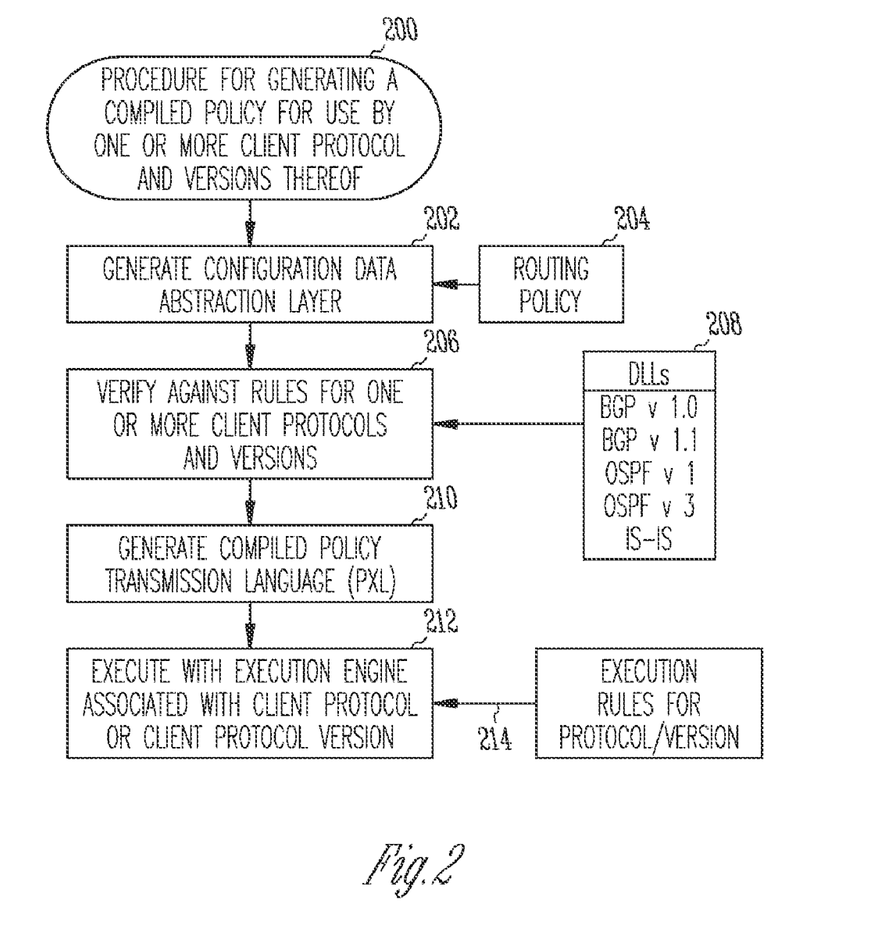
FIG. 2 is a flow-chart of a route policy compilation procedure in accordance with some embodiments of the present invention.

FIG. 2 is a flow chart of a route policy compilation procedure in accordance with some embodiments of the present invention. Procedure 200 may be performed by a compiler, such as policy compiler 100 (FIG. 1A), and/or a router, such as router 150 (FIG. 1B), although other systems may also be suitable. Procedure 200 may be used to generate and execute a compiled policy, such as a compiled policy in policy transmission language for execution by one or more client protocols, such as client protocols 112 (FIG. 1A), including one or more versions of the client protocols.

Operation 202 may comprise generating configuration data abstraction layer 104 (FIG. 1A) for routing policy 204 to map configuration to an intermediate layer.

Operation 206 may comprise verifying the intermediate layer against a set of rules 208 for one or more client protocols including one or more versions thereof.

Operation 210 may comprise generating compiled policy transmission language when the statements of the intermediate layer are verified against the set of rules for the one or more client protocols including one or more versions thereof. In some embodiments, compiled policy transmission language may be generated when all statements of the intermediate layer are verified, although the scope of the invention is not limited in this respect.

Once compiled policy transmission language is generated, operation 212 may be performed. Operation 212 may comprise executing the compiled policy transmission language with an execution engine associated with the one or more client protocols or versions thereof. The executing may be based on execution rules for the one or more client protocols or versions thereof. In some embodiments, the execution rules may be provided by a client dynamic link library (DLL) associated with a client protocol or a version thereof.

In some embodiments, operation 206 may comprise verifying the routing policy against a border gateway protocol (BGP) client protocol, an open-shortest-path-first (OSPF) client protocol and/or an intermediate system to intermediate system (IS-IS) client protocol. In these embodiments, operation 212 may comprise separately executing, with an execution engine associated with each of the client protocols including versions thereof, the compiled policy transmission language.

Figure 3:
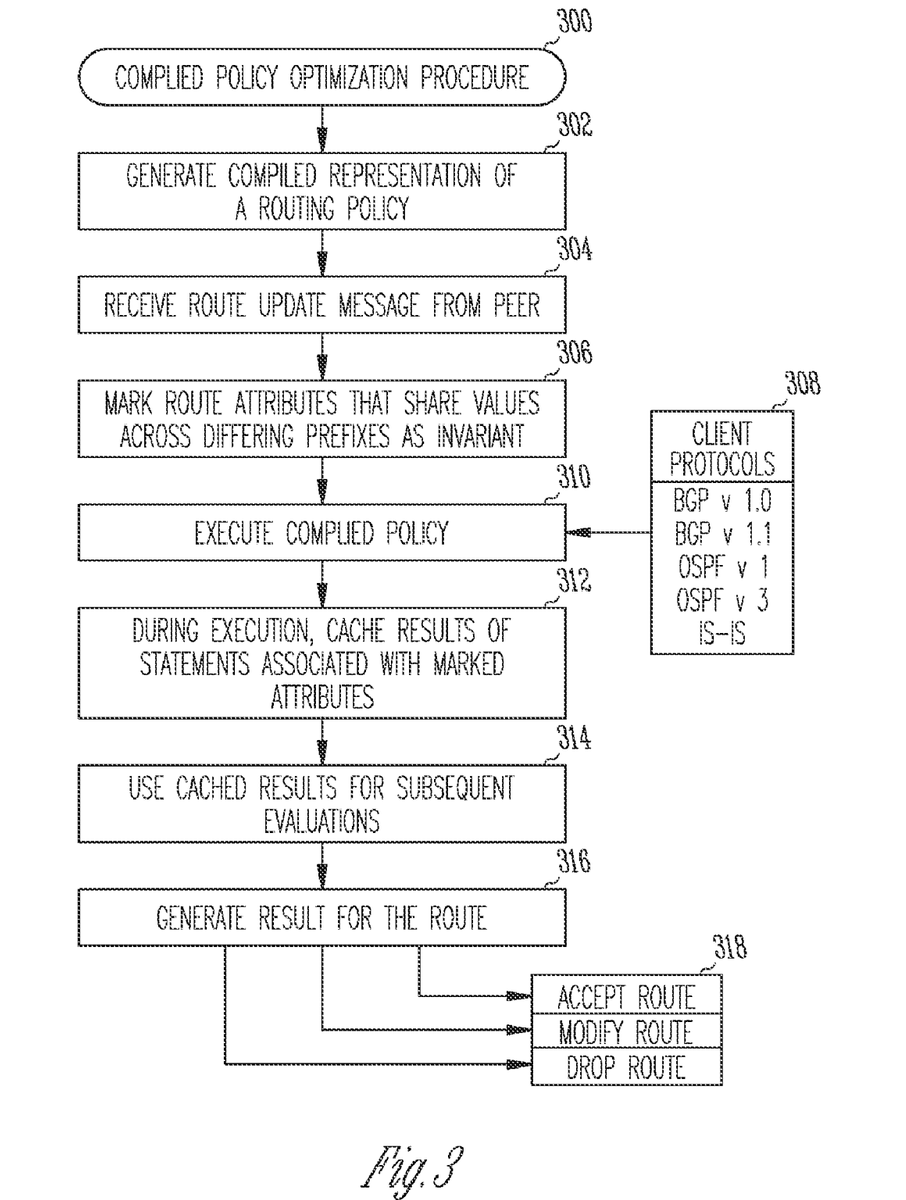
FIG. 3 is a flow-chart of a compiled policy optimization procedure in accordance with some embodiments of the present invention.

FIG. 3 is a flow chart of a compiled policy optimization procedure in accordance with some embodiments of the present invention. Compiled policy optimization procedure 300 may be used to improve the performance of a compiled policy, such as a compiled policy in policy transmission language; although other forms of compiled routing policies may also be suitable. Procedure 300 may be performed by a compiler, such as policy compiler 100 (FIG. 1A), and/or a router, such as router 150 (FIG. 1B), although other systems may also be suitable for performing procedure 300. Procedure 300 may result in a reduction in processing operations by an execution engine, such as one of execution engines 120 (FIG. 1A), for a particular client protocol 112 (FIG. 1A) or version thereof.

Operation 302 comprises generating a compiled representation of a routing policy. Operation 302 may include performing one or more operations of procedure 200 (FIG. 2) to generate a compiled routing policy in policy transmission language, although other procedures may also be used to generate a compiled representation of a routing policy.

Operation 304 comprises receiving a route update message from a peer router. The route update message may be associated with one client protocol 112 (FIG. 1A) and may be associated with a version of the client protocol. In some embodiments, the route update message may include a plurality (i.e., a batch) of updated routes. At least some of the updated routes may have differing prefixes (i.e., different routes) and may have attributes of identical values. In some embodiments, there may be many routes identified in a route update message that may share identical attributes, although the scope of the invention is not limited in this respect.

Operation 306 comprises marking route attributes in a route update as invariant for route attributes that share values across differing route prefixes. In some embodiments, operation 306 may include marking statements in the compiled representation of the policy as invariant when one or more attributes of a route do not change with respect to the received routes that are to be executed with respect to an associated policy. In some embodiments, operation 306 may include marking the attributes of identical or invariant values of the updated routes.

Operation 310 comprises executing the compiled policy with the marked route attributes. In some embodiments, operation 308 may include running the compiled policy on an execution engine associated with a particular one of client protocols 308 associated with the received route update message from operation 304.

Operation 312 comprises caching results for statements associated with the marked attributes when executing the compiled policy. Upon continued execution of the compiled policy (e.g., for each route prefix in a batch of received routes), operation 314 may use the cached results for evaluations of subsequent statements in the policy which reference the marked attributes. Operation 312 may include temporarily storing results of executing the statements associated with the marked attributes when executing the compiled policy. In some embodiments, the use of the cached results may result in reduced processing operations for the associated execution engine.

Operation 316 comprises generating results 318 for routes received as part of the route update message. Results 318 may include a modified route, an accepted and unchanged route, or dropped route.

In some embodiments, the caching of operation 312 may include caching results of comparison statements that reference route attributes marked as invariant. In some embodiments, the caching may apply primarily to comparison statements of a route policy, although the scope of the invention is not limited in this respect. In these embodiments, during operation 310, the execution engine may refrain from executing comparison statements in a compiled policy having cached results.

Figure 4:
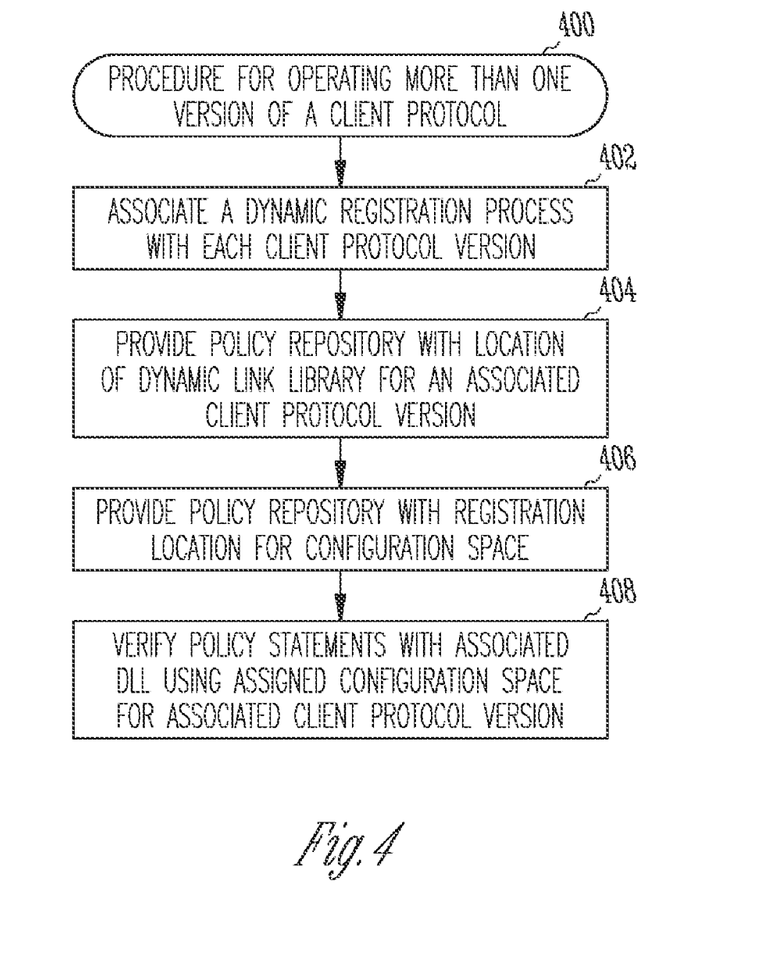
FIG. 4 is a flow chart of a procedure for operating more than one version of a client protocol on a router.

FIG. 4 is a flow chart of a procedure for operating more than one version of a client protocol on a router. Procedure 400 may be performed by a compiler, such as policy compiler 100 (FIG. 1A), and/or a router, such as router 150 (FIG. 1B), although other systems may also be suitable. In some embodiments, procedure 400 may allow the running of at least first and second versions of client protocols 116 & 118 (FIG. 1A) on a router.

Operation 402 comprises associating dynamic registration processes, such as dynamic registration processes 122 (FIG. 1A), with at least first and second versions of a client protocol. For example, separate dynamic registration processes 122 (FIG. 1A) for BGP version 1.0 and BGP version 1.1 may be associated with client protocols 116 and 118 (FIG. 1A).

Operation 404 may comprise the dynamic registration processes providing policy repository 106 (FIG. 1A) with a location of a dynamic link library for an associated version of the client protocol.

Operation 406 may comprise the dynamic registration processes providing policy repository 106 (FIG. 1A) with a registration location for configuration space to be used by a routing policy for use when registering with the associated version of the client protocol. In some embodiments, each version of a client protocol may have configuration space and a DLL associated therewith.

Operation 408 may be performed when a routing policy is to be registered with second version of the client protocol while a first version of the client protocol is running on the router. Operation 408 comprises verifying policy statements of the routing policy with verification rules in the DLL associated with the second version of the client protocol. As part of operation 408, the configuration space associated with the second version of the client protocol may be used for the verification.

In some embodiments, the support of two versions of a client protocol may utilize separate locations for configuration storage (e.g., configuration space). In these embodiments, each configuration space may have a corresponding set of rules that may be used to verify the associated version of the client protocol and the DLL that supports that version.

In some embodiments, first and second DLLs may be associated respectively with the first and second versions of a client protocol. The DLLs may comprise verification rules for the associated version of the client protocol.

In some embodiments, a second version of the client protocol may be a newer or later version of an existing client protocol, and a first version of the client protocol may be an older or prior version of client protocol, however, the scope of the present invention is not limited in this respect. For example, the first version of the client protocol may be BGP version 1.0, and the second version of the client protocol may be BGP version 1.1. In other embodiments, the second version of the client protocol may be an older version, and the first version of the client protocol may be newer version of a client protocol.

In some embodiments, procedure 400 may include associating an additional dynamic registration process for each additional client protocol. In some embodiments, the additional client protocols may include an open-shortest-path-first (OSPF) client protocol and/or an intermediate system to intermediate system (IS-IS) client protocol. Other unicast as well as multicast protocols may also be applicable.

In some embodiments, when policy statements of a routing policy requesting use of the second version of the client protocol are verified in operation 408, procedure 400 may also comprise moving at least some peer routers to the second version of the client protocol, and removing the at least some peer routers from the first version of the client protocol. In some embodiments, peering relationships between routers may be established during the configuration of the client protocols. The moving and removing of peers may include the router sending update messages to peer routers.

In some embodiments, when a new version of an existing client protocol is to be evaluated on a router while an earlier version of the client protocol is running on the router, procedure 400 may comprise, prior to performing operation 402, loading or installing the new version of the client protocol on the router, and loading or installing a dynamic registration process associated with the new version of the client protocol on the router.

In some embodiments, procedure 400 may include querying the policy repository for capabilities of configuration associated with the second version of the client protocol when a configuration is being added or as each token is parsed. In some embodiments, a parser may query policy repository 106 (FIG. 1A) to build a valid parse tree based on the capabilities present in the repository that were in turn loaded from client protocols 112 (FIG. 1A). This may allow the parser to handle multiple versions by querying valid options that are loaded on the router from the policy repository. In some embodiments, when configuration between versions is different, separate parsers may be provided to parse the different configurations, although the scope of the present invention is not limited in this respect.

Figure 5:
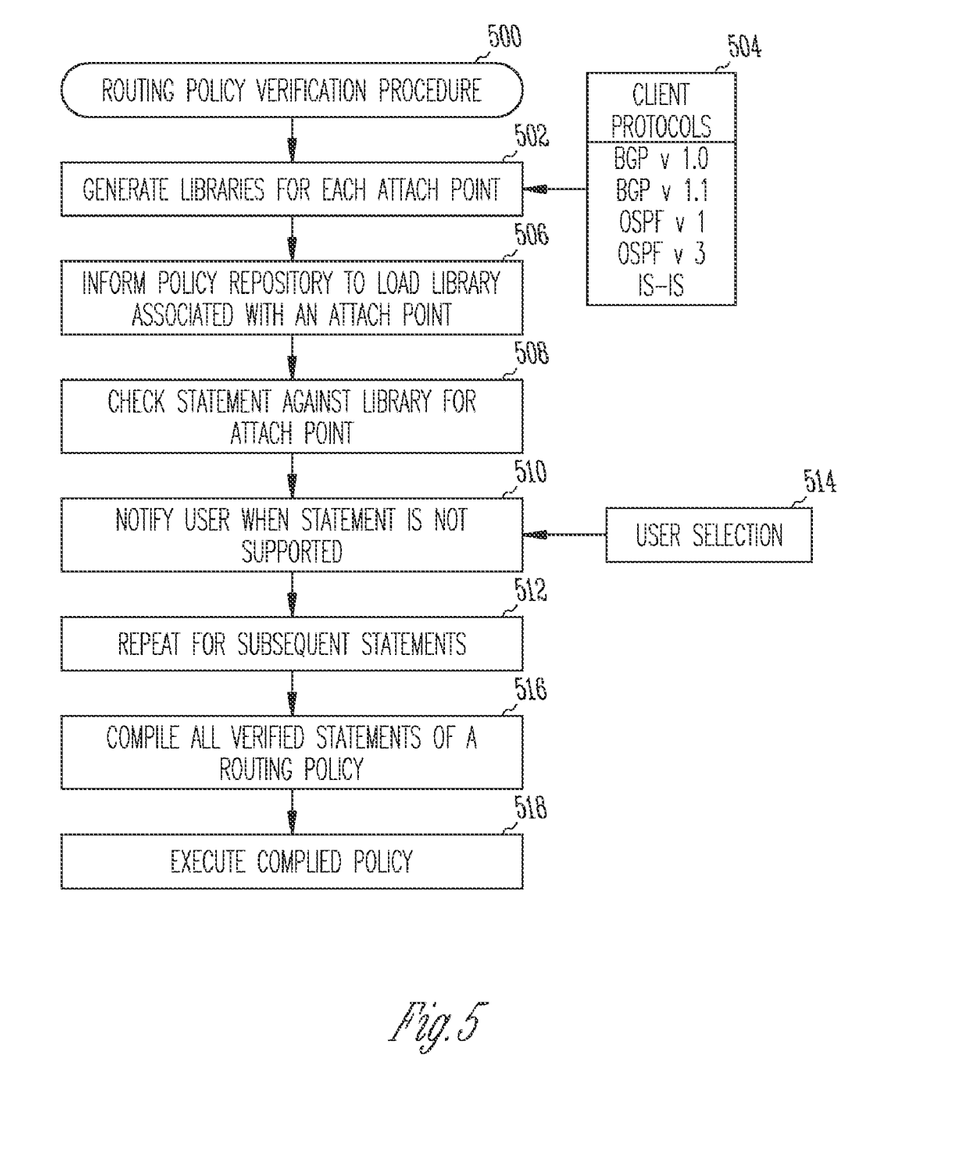
FIG. 5 is a flow chart of a routing policy verification procedure in accordance with some embodiments of the present invention.

FIG. 5 is a flow chart of a routing policy verification procedure in accordance with some embodiments of the present invention. Routing policy verification procedure 500 may be performed by a compiler, such as policy compiler 100 (FIG. 1A), and/or a router, such as router 150 (FIG. 1B), although other systems may also be suitable. In some embodiments, procedure 500 provides for the crosschecking of a routing policy during its generation before the policy is used. In some embodiments, procedure 500 may verify statements of a new or newly added routing policy prior to compiling the routing policy and executing the compiled routing policy at an attach point.

Operation 502 may comprise generating libraries, such as DLLs 108 (FIG. 1A), for each of the attach points associated with one or more versions of client protocols 504. The libraries may include capabilities for the one or more versions of the client protocols.

Operation 506 comprises informing a policy repository, such as policy repository 106 (FIG. 1A), to load one of the libraries associated with a particular attach point associated with a version of a client protocol. In some embodiments, operation 506 may be performed by dynamic registration processes, such as dynamic registration processes 122 (FIG. 1A), which may be associated with a version of a client protocol.

Operation 508 comprises individually checking statements of a routing policy against the capabilities of one or more of the attach points and one or more of the client protocol versions. In some embodiments, operation 508 may be performed during generation of the routing policy. In some embodiments, operation 508 comprises checking the statements when the routing policy is initially being defined (e.g., when entered by a user), although the scope of the invention is not limited in this respect.

In some embodiments, the libraries may describe fields supported by an associated version of a client protocol. In these embodiments, the libraries may further describe operators supported by the fields for the associated version of a client protocol. In some embodiments, the libraries may include a verification function for field-operator combinations for the associated version of a client protocol. In these embodiments, the verification function may be used by policy repository 106 (FIG. 1A), and operation 508 may include applying a policy at an attach point for the associated version of a client protocol.

In some embodiments, each of the versions of the client protocols may have one or more attach points. The attach points may comprise incoming neighbor points, outgoing neighbor points, aggregation points and/or dampening points. In some embodiments, the BGP client protocol versions may have up to five or more attach points, for example. In some embodiments, attach points may be points in a routing system where policy is applied, such as locations where a route map is used. A routing policy may be applied between two points, generally referred to as a source and a destination (or sink). In this way, a routing policy may be viewed as a one-way directed operation, like a vector, between the two points. An attach point is a code point where a routing protocol may apply a routing policy to achieve a desired result or effect on a set of routes. Accordingly, an attach point may support a certain set of fields and operators on those fields. When these field-operator pairings (statements) are grouped together in a policy, they may provide the desired effect, which may be to alter the routes.

Operation 510 comprises providing an indication when a statement of the routing policy currently being checked is not supported by capabilities 124 (FIG. 1A) of one of the attach points. In some embodiments, operation 510 may provide the indication to a user. In some embodiments, operation 510 may be performed concurrently with operation 508. As part of operation 510, a selection 514 may be received by a user. The selection may direct operation 508 to either skip a statement not supported by the attach point, or reject the policy when the statement is not supported by the attach point. In some embodiments, the indication may be selectable by the user and may include ignoring the statement when an operation is not supported by the attach point, ignoring and warning that the operation is not supported by the attach point, or rejecting the policy when the operation is not supported by the attach point.

Operation 514 comprises repeating operations 508 through 510 for other statements in the policy. When all statements of the routing policy are checked, operation 516 may be performed.

Operation 516 comprises compiling the routing policy when either all statements are verified or when statements not supported by an attach point are skipped. In some embodiments, operation 516 comprises compiling all verified statements of a routing policy. Unsupported statements may optionally be skipped.

Operation 518 comprises executing the compiled routing policy. Unsupported statements may optionally be skipped. Operation 518 may be performed by an execution engine, such as one or more of execution engines 120 (FIG. 1A) of a version of a client protocol 112 (FIG. 1A). During execution, the statements not supported by an associated attach point may be skipped. In some embodiments, the skipped statements may comprise assignment operators (rather than comparison operators), although the scope of the invention is not limited in this respect.

In some embodiments, the compiling of operation 516 may be independent of whether client protocols may have chosen both to ignore and reject the same policy at different attach points. The executing of operation 518, on the other hand, may not necessarily execute statements that were not verified. In some embodiments, the execution engine may determine whether the statement was either designated as ignore, warn or reject, and may skip or execute the statement accordingly.

In some embodiments, operation 510 may include providing a notification when all statements of the routing policy are verified for at least one attach point. In these embodiments, the notification may include which of the one or more attach points the policy may be valid for. When a policy is being generated, the system may not necessarily know which attach point the policy may be being generated for, so, in accordance with some embodiments, operation 508 may check the statements against the capabilities supported by all attach points.

In some embodiments, a user may inform the system which one or more attach points the policy is being written for. In these embodiments, procedure 500 may include operations to prevent the user from entering invalid statements for a particular attach point (i.e., from a capability/syntax perspective).

In some embodiments, a policy may be rejected and a user may need to revise the policy so that statements can be verified for a particular attach point. In some embodiments, the user may select whether to provide a reject, warn or skip for a statement of a policy for any particular attach point or for all attach points. When the policy is compiled, an execution engine may ignore/skip a statement that could not be verified. The user, however, may be aware of which statements will be skipped during execution because the user may have been informed of these statements during policy generation.

Figure 6:
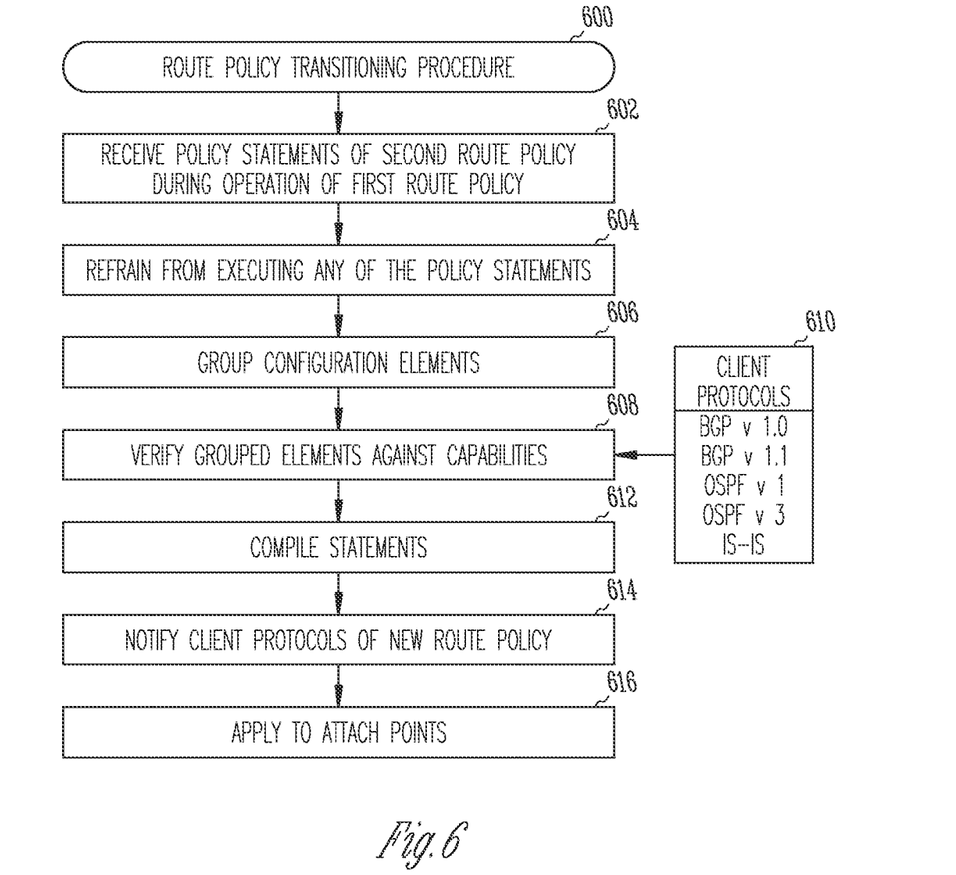
FIG. 6 is a flow chart of a route policy transitioning procedure in accordance with embodiments of the present invention.

FIG. 6 is a flow chart of a route policy transitioning procedure in accordance with embodiments of the present invention. Procedure 600 may be performed by a compiler, such as policy compiler 100 (FIG. 1A), and/or a router, such as router 150 (FIG. 1B), although other systems may also be suitable for performing procedure 600. In some embodiments, procedure 600 may be performed by a router when transitioning between routing policies. In accordance with these embodiments, when the router transitions from a first configuration state associated with the first route policy to a second configuration state associated with a second route policy, transitions to intermediate configuration states may be eliminated.

Operation 602 comprises receiving statements representing a second policy from an operator or a user. In some embodiments, the statements may be entered by a user or operator through I/O 126 (FIG. 1A). Alternatively, in some embodiments, the policy may already have been entered, and the user or operator may instruct the router to read the entire policy as a whole from memory or some other computer-readable medium.

Operation 604 comprises refraining from executing any of the policy statements during operation 602.

Operation 606 comprises grouping configuration elements of the second route policy into policy statements and sets.

Operation 608 comprises verifying the grouped configuration elements against the capabilities with verification rules, such as verification rules associated with DLLs 108 (FIG. 1A), which may be associated with versions of client protocols 610.

Operation 612 comprises compiling statements of the second route policy. In some embodiments, operation 612 may be performed when the statements are verified for at least one of the versions of client protocols 610.

Operation 614 comprises notifying at least one version of the client protocols that the second route policy is ready to take effect. In some embodiments, after operation 612, procedure 600 may include overwriting (e.g., replacing) a compiled version of the first route policy with the compiled second route policy. The second route policy may be in compiled policy transmission language, although the scope of the invention is not limited in this respect.

Operation 616 comprises applying the second route policy to attach points. In some embodiments, in response to the notifying of operation 614, the client protocols may read and/or execute the compiled second route policy. The router may then apply the second route policy to attach points associated with the client protocols. In some embodiments, the second route policy may be applied and used at attach points for which it was verified.

In embodiments, grouping statements in operation 606 may prevent the statements from being executed one at a time which may result in an intermediate router configuration state for each statement of the second policy. These intermediate router configuration states may result in undesirable results which may cause network instability. For example, during an intermediate router configuration state, the router may advertise or accept undesired route.

In some embodiments, the second route policy may comprise policy statements that identify fields, operators and arguments. In these embodiments, operation 608 may comprise, for each route policy statement, verifying fields for one or more versions of the client protocols, verifying field-operator pairing for one or more versions of the client protocols, and verifying arguments for each field-operator pairing for one or more versions of the client protocols.

In some embodiments, when statements of the second route policy are verified, the policy may be accepted as a whole. In some embodiments, when any of the statements do not verify, the policy may be rejected as a whole. In some embodiments, a policy having some statements that do not verify may be accepted and compiled. In these embodiments, the statements that did not verify for a particular client protocol or client protocol version may be ignored during execution as previously discussed. In these embodiments, a user or operator may determine whether to accept or reject the policy based on the statements that do not verify.

Although the individual operations of procedures 200 (FIG. 2), 300 (FIG. 3), 400 (FIG. 4), 500 (FIG. 5) and 600 (FIG. 6) are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing information in a form readable by a machine (e.g., a computer). For example, a machine-readable medium may include read-only memory (ROM), random-access memory (RAM), magnetic disk storage media, optical storage media, flash-memory devices, and others.

It is emphasized that the Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features that are expressly recited in each claim. Rather, as the following claims reflect, inventive subject matter lies in less than all features of a single disclosed embodiment. Thus the following claims are hereby incorporated into the detailed description, with each claim standing on its own as a separate preferred embodiment.

What is claimed is:

1. A policy compiler comprising:
a system controller to generate a configuration data abstraction layer of a routing policy, the configuration data abstraction layer to map a routing policy configuration to an intermediate layer comprising fields, operators and arguments; and
a policy repository to verify the intermediate layer against a set of verification rules for one or more of a plurality of client protocols including versions thereof, the policy repository to verify field-operator parings in the routing policy, and to verify one or more arguments used for each field-operator pairing in the routing policy, the set of verification rules being associated with a client dynamic link library (DLL) for each of the client protocols, the policy repository to generate a compiled policy transmission language for use by the one or more of the plurality of client protocols including versions thereof.

2. The compiler of claim 1 wherein the policy repository is to validate the policy against at least two versions of a border gateway protocol (BGP), and
wherein the compiled policy transmission language is to be executed by the at least two versions of the border gateway protocol.

3. The compiler of claim 1 wherein the policy repository is to further validate the policy against one or more versions of a border gateway protocol (BGP) client protocol, one or more versions of an open-shortest-path-first (OSPF) client protocol and one or more versions of an intermediate system to intermediate system (IS-IS) client protocol, and
wherein the compiler further comprises an execution engine associated with each of the one or more versions of the client protocols, the associated execution engines to separately execute the compiled policy transmission language of the associated client protocol.

4. The compiler of claim 1 wherein the policy repository is to perform a verification in response to a request for use of the policy for an attach point, the attach point being a set of capabilities associated with a version of one of the client protocols.

5. The compiler of claim 1 wherein the compiled policy transmission language comprises a set of rules for each policy statement of a verified policy for execution by an execution engine associated with ones of the client protocols and versions thereof when verified against ones of the client protocols and versions thereof.

6. The compiler of claim 1 further comprising an execution engine for each of a plurality of client protocols and versions thereof,
wherein the execution engines are to execute the compiled policy transmission language based on execution rules provided by an associated client dynamic link library (DLL).

7. The compiler of claim 6 wherein the execution rules provided by one of the client DLLs are used by an execution engine of the associated version of one of the client protocols during execution of the compiled policy.

8. The compiler of claim 6 wherein the system controller is to perform an optimization procedure to improve execution performance of the compiled policy transmission language, wherein as part of the optimization procedure comprises rearranging policy statements to improve the execution performance,
wherein for a field-operator pair in an associated one of the client DLLs, the system controller is to determine when a statement is processing intensive, and is to rearrange at least some of the statements to check at least some processing intensive during execution after less processing intensive statements.

9. The compiler of claim 8 wherein as part of the optimization procedure, the system controller is to further eliminate at least some repeated statements or repeated portions of statements, and
wherein the policy repository is to generate an optimized compiled policy in policy transmission language prior to compiling.

10. The compiler of claim 1 wherein at least one of the versions of the client protocols is to mark route attributes in a batch of routes as invariant for route attributes that share values across differing route prefixes, and
wherein an execution engine associated with one of the client protocols is to cache results for statements associated with the marked attributes when executing the compiled policy transmission language,
wherein upon continued execution of the compiled policy transmission language, the execution engine is to use the cached results for evaluations of subsequent statements in the policy which reference the marked attributes.

11. A method implemented by a policy compiler, the method comprising:
generating a configuration data abstraction layer of a routing policy to map a routing policy configuration to an intermediate layer;
verifying the intermediate layer against a set of verification rules for one or more of a plurality of client protocols including one or more versions thereof, the set of verification rules being associated with a client dynamic link library (DLL) for each of the client protocols;
verifying field-operator parings in the routing policy and verifying one or more arguments used for each field-operator pairing in the routing policy; and
generating a compiled policy transmission language when statements of the intermediate layer are verified against the set of verification rules for the one or more of the plurality of client protocols including the one or more versions thereof.

12. The method of claim 11 further comprising executing the compiled policy transmission language with an execution engine associated with the one or more of the plurality of client protocols including the one or more versions thereof, the executing being based on execution rules for the one or more of the plurality of client protocols including the one or more versions thereof, the execution rules being provided by a client dynamic link library (DLL) associated with the one or more of the plurality of client protocols including the one or more versions thereof.

13. The method of claim 12 wherein validating comprises verifying the routing policy against a border gateway protocol (BGP) client protocol, an open-shortest-path-first (OSPF) client protocol and an intermediate system to intermediate system (IS-IS) client protocol, and
wherein executing further comprises separately executing, with an execution engine associated with each of the client protocols including versions thereof, the compiled policy transmission language.

14. The method of claim 11 wherein generating compiled policy transmission language comprises performing an optimization procedure to improved execution performance of the compiled policy transmission language,
  wherein the optimization procedure comprises rearranging policy statements to improve the performance,
  wherein for a field-operator pair in an associated client DLL, the rearranging comprises:
  determining when a statement is processing intensive; and
  rearranging statements of the policy to check at least some of the processing intensive statements after less processing intensive statements.

15. The method of claim 14 wherein the optimization procedure further comprises eliminating at least some repeated statements including repeated portions of the statements, and
  wherein as part of the compiling, the method comprises generating an optimized policy transmission language with the eliminated statements and eliminated repeated portions of the statements.

16. The method of claim 14 further comprising:
  marking route attributes in a batch of routes as invariant for ones of the route attributes that share values across differing route prefixes; and
  caching results for statements associated with the marked attributes when executing the compiled policy transmission language,
  wherein upon continued execution of the compiled policy transmission language, using the cached results for evaluations of subsequent statements in the compiled policy transmission language which reference the marked attributes.

17. A machine-readable medium that provides instructions, which when executed by one or more processors, cause the processors to
  generate a configuration data abstraction layer of a routing policy to map a routing policy configuration to an intermediate layer;
  verify the intermediate layer against a set of verification rules for one or more of a plurality of client protocols including one or more versions thereof, the set of verification rules being associated with a client dynamic link library (DLL) for each of the client protocols;
  verify field-operator parings in the routing policy and verifying one or more arguments used for each field-operator pairing in the routing policy; and
  generate compiled policy transmission language when statements of the intermediate layer are verified against the set of verification rules for the one or more of the plurality of client protocols including the one or more versions thereof.

18. A method implemented by a policy compiler, the method comprising:
  generating libraries for attach points associated with one or more versions of one or more of a plurality of client protocols, the libraries to include capabilities for the one or more versions of the one or more of the plurality of client protocols, the libraries to describe fields supported by an associated one of the versions of the one or more of the plurality of client protocols, the libraries further to describe operators supported by the fields for the associated one of the versions of the one or more of the plurality of client protocols, the libraries further to include a verification function for field-operator combinations associated with one of the versions of the one or more of the plurality of client protocols; and
  individually checking statements of a routing policy against the capabilities of one or more of the attach points and individually checking the statements when the routing policy is initially being defined.

19. The method of claim 18 further comprising informing a policy repository to load one of the libraries associated with a particular one of the attach points associated with one of the versions of the one or more of the plurality of client protocols,
  wherein the informing is performed by a dynamic registration process associated with one of the versions of the one or more of the plurality of client protocols.

20. The method of claim 19 wherein the versions of the one or more of the plurality of client protocols have one or more attach points, the attach points comprising at least some of incoming neighbor points, outgoing neighbor points, aggregation points and dampening points.

21. The method of claim 19 further comprising:
  during the checking, providing an indication when a statement of the routing policy currently being checked is not supported by the capabilities of one of the attach points; and
  receiving a selection by a user, the selection to direct a policy repository to either skip the statement not supported by an attach point, or reject the policy when the statement is not supported by an attach point.

22. The method of claim 21 wherein the indication is selectable and includes one of ignoring the statement when an operation is not supported by an attach point, ignoring and warning that the operation is not supported by an attach point, and rejecting the policy when the operation is not supported by an attach point.

23. The method of claim 21 further comprising:
  compiling the routing policy when either all statements are verified or when statements not supported by an attach point are skipped; and
  when executing the compiled routing policy by an execution engine of a version of a client protocol, skipping the statements not supported by an associated attach point,
  wherein the skipped statements comprise comparison operators.

24. The method of claim 22 further comprising performing a verification for statements of the policy having comparison operators when applying a compiled policy to an attach point.

25. The method of claim 18 further comprising providing a notification when all statements of a policy are verified for at least one attach point, the notification to include which of the one or more attach points the policy is valid.

26. A policy compiler comprising:
  a policy repository to store capabilities for attach points,
  one or more processors to implement a plurality of dynamic registration processes to inform the policy repository of the capabilities for the attach points, the dynamic registration processes being associated with a version of a client protocol; and
  libraries for attach points associated with one or more versions of one or more of a plurality of client protocols, the libraries to include capabilities for the one or more versions of the one or more of the plurality of client protocols,
  wherein the policy repository is to check statements of a routing policy against the capabilities of one or more of the attach points during generation of the policy.

27. The policy compiler of claim 26 wherein the libraries describe fields supported by an associated one of the versions of the one or more of the plurality of client protocols,
  wherein the libraries further describe operators supported by the fields for the associated one of the versions of the one or more of the plurality of client protocols, and wherein the libraries include a verification function for field-operator combinations associated with one of the versions of the one or more of the plurality of client protocols.

28. The policy compiler of claim 27 wherein the policy repository is to further individually check statements when the routing policy is initially being defined.

29. The policy compiler of claim 28 wherein one of the dynamic registration processes associated with one of the versions of the one or more of the plurality of client protocols is to inform a policy repository to load one of the libraries associated with a particular one of the attach points associated with one of the versions of the one or more of the plurality of client protocols.

30. The policy compiler of claim 29 wherein the versions of the one or more of the plurality of client protocols have one or more attach points, the attach points comprising at least some of incoming neighbor points, outgoing neighbor points, aggregation points and dampening points.

31. The policy compiler of claim 29 further comprising an I/O, wherein during the checking, the policy compiler is to provide an indication when a statement of the routing policy currently being checked is not supported by the capabilities of an attach point, and
wherein a selection by a user is to be received through the I/O, the selection to direct the policy repository to either skip the statement not supported by an attach point, or reject the policy when the statement is not supported by an attach point.

32. The policy compiler of claim 31 wherein the indication is selectable and includes one of ignoring the statement when an operation is not supported by an attach point, ignoring and warning that the operation is not supported by an attach point, and rejecting the policy when the operation is not supported by an attach point.

33. The policy compiler of claim 31 wherein the policy repository is to compile the routing policy when either all statements are verified or when statements not supported by an attach point are skipped, and
wherein the policy compiler further comprises an execution engine associated with a version of a client protocol, the execution engine to execute the compiled routing policy and to skip statements not supported by an associated attach point.

34. A machine-readable medium that provides instructions, which when executed by one or more processors, cause the processors to:
generate libraries for attach points associated with one or more versions of one or more of a plurality of client protocols, the libraries to include capabilities for the one or more versions of the one or more of the plurality of client protocols, the libraries to describe fields supported by an associated one of the versions of the one or more of the plurality of client protocols, the libraries further to describe operators supported by the fields for the associated one of the versions of the one or more of the plurality of client protocols, the libraries further to include a verification function for field-operator combinations associated with one of the versions of the one or more of the plurality of client protocols; and
individually check statements of a routing policy against the capabilities of one or more of the attach points and individually check the statements when the routing policy is initially being defined.

35. A method implemented by a policy compiler, the method comprising:

transitioning between routing policies, wherein a first configuration state is associated with a first route policy, wherein a second configuration state is associated with a second route policy, and wherein the first configuration state is a current configuration state of a router;
grouping configuration elements of the second route policy into policy statements and sets;
verifying the grouped configuration elements against capabilities with verification rules associated with one or more versions of one or more of a plurality of client protocols;
compiling statements of the second route policy when verified for at least one of the one or more versions of the one or more of the plurality of client protocols; and
notifying the at least one of the one or more versions of the one or more of the plurality of client protocols that the second route policy is to take effect.

36. The method of claim 35 further comprising, after the compiling, overwriting a compiled version of the first route policy with the compiled second route policy, the second route policy being in a compiled policy transmission language.

37. The method of claim 36 wherein in response to the notifying, the at least one of the one or more versions of the one or more of the plurality of client protocols is to execute the compiled second route policy, and
wherein the router is to apply the second route policy to attach points associated with the at least one of the one or more versions of the one or more of the plurality of client protocols.

38. The method of claim 37 wherein prior to and during the grouping, the verifying, the compiling and the notifying, the method further comprising running the first route policy.

39. The method of claim 35 further comprising receiving statements representing the second route policy from an operator.

40. The method of claim 37 wherein the second route policy comprises policy statements that identify fields, operators and arguments, and
wherein verifying comprises, for each policy statement:
verifying fields for the one or more versions of the one or more of the plurality of client protocols;
verifying field-operator pairings for the one or more versions of the one or more of the plurality of client protocols; and
verifying arguments for each field-operator pairing for the one or more versions of the one or more of the plurality of client protocols.

41. A policy compiler to transition a router from a first configuration state associated with the first route policy to a second configuration state associated with a second route policy, the policy compiler comprising:
a policy repository to group configuration elements of the second route policy into policy statements and sets, and to verify the grouped configuration elements against capabilities with verification rules associated with one or more versions of one or more of a plurality of client protocols, the policy repository to further compile statements of the second route policy when verified for at least one of the one or more versions of the one or more of the plurality of client protocols; and
a system controller to notify the at least one of the one or more versions of the one or more of the plurality of client protocols that the second route policy is to take effect.

42. The policy compiler of claim 41 wherein after compiling, the policy repository is to overwrite a compiled version of the first route policy with the compiled second route policy, the second route policy being in a compiled policy transmission language.

43. The policy compiler of claim 42 wherein the at least one of the one or more versions of the one or more of the plurality of client protocols is to execute the compiled second route policy, and
 wherein the router is to apply the second route policy to attach points associated with the at least one of the one or more versions of the one or more of the plurality of client protocols.

44. The policy compiler of claim 43, wherein prior to and during the policy repository grouping, verifying, and compiling, the router is to run the first route policy.

45. The policy compiler of claim 44 further comprising an I/O to receive the statements representing the second policy from an operator.

46. The policy compiler of claim 45 wherein the second route policy comprises policy statements that identify fields, operators and arguments, and
 wherein the policy repository is to verify, for route policy statement, fields for the one or more versions of the one or more of the plurality of client protocols, field-operator pairing for the one or more versions of one or more of the plurality of client protocols, and arguments for each field-operator pairing for the one or more versions of the one or more of the plurality of client protocols.

47. A machine-readable medium that provides instructions, which when executed by one or more processors, cause the processors to perform operations for transitioning between routing policies, wherein a first configuration state is associated with the first route policy, wherein a second configuration state is associated with a second route policy, and wherein the first configuration state is a current configuration state of a router, the operations comprising:
 grouping configuration elements of the second route policy into policy statements and sets;
 verifying the grouped configuration elements against capabilities with verification rules associated with one or more versions of one or more of a plurality of client protocols;
 compiling statements of the second route policy when verified for at least one of the one or more versions of the one or more of the plurality of client protocols; and
 notifying the at least one of the one or more versions of the one or more of the plurality of client protocols that the second route policy is to take effect.

* * * * *